(12) United States Patent
Bouzguarrou et al.

(10) Patent No.: US 11,861,368 B2
(45) Date of Patent: Jan. 2, 2024

(54) RE-ENABLING USE OF PREDICTION TABLE AFTER EXECUTION STATE SWITCH

(71) Applicant: Arm Limited, Cambridge (GB)

(72) Inventors: Houdhaifa Bouzguarrou, Valbonne (FR); Michael Brian Schinzler, Round Rock, TX (US); Yasuo Ishii, Austin, TX (US); Jatin Bhartia, Cambridge (GB); Sumanth Chengad Raghu, St. Ives (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/752,060

(22) Filed: May 24, 2022

(65) Prior Publication Data

US 2023/0385066 A1 Nov. 30, 2023

(51) Int. Cl.
*G06F 9/38* (2018.01)
*G06F 21/50* (2013.01)
*G06F 9/48* (2006.01)

(52) U.S. Cl.
CPC .......... *G06F 9/3848* (2013.01); *G06F 9/3844* (2013.01); *G06F 9/3806* (2013.01); *G06F 9/48* (2013.01); *G06F 21/50* (2013.01)

(58) Field of Classification Search
CPC ......... G06F 9/48; G06F 9/3848; G06F 9/3844
See application file for complete search history.

(56) References Cited

U.S. PATENT DOCUMENTS

| | | | | |
|---|---|---|---|---|
| 2013/0191824 | A1* | 7/2013 | Muff | G06F 9/3848 718/1 |
| 2015/0301832 | A1* | 10/2015 | Zhang | G06F 9/3861 712/207 |
| 2015/0331691 | A1* | 11/2015 | Levitan | G06F 9/3861 712/240 |
| 2018/0314525 | A1* | 11/2018 | Sadasivam | G06F 9/3848 |
| 2019/0163902 | A1* | 5/2019 | Reid | G06F 21/78 |
| 2019/0361707 | A1* | 11/2019 | Vougioukas | G06F 9/3861 |

(Continued)

OTHER PUBLICATIONS

André Seznec and Pierre Michaud, "A case for (partially) tagged geometric history length branch prediction", The Journal of Instruction-Level Parallelism, pp. 1-23 (Year: 2006).*

(Continued)

*Primary Examiner* — Courtney P Carmichael-Moody
(74) *Attorney, Agent, or Firm* — NIXON & VANDERHYE P.C.

(57) ABSTRACT

A first type of prediction, for controlling execution of at least one instruction by processing circuitry, is based at least on a first prediction table storing prediction information looked up based on at least a first portion of branch history information stored in branch history storage corresponding to a first predetermined number of branches. In response to detecting an execution state switch of the processing circuitry from a first execution state to a second, more privileged, execution state, use of the first prediction table for determining the first type of prediction is disabled. In response to detecting that a number of branches causing an update to the branch history storage since the execution state switch is greater than or equal to the first predetermined number, use of the first prediction table in determining the first type of prediction is re-enabled.

18 Claims, 7 Drawing Sheets

(56) References Cited

U.S. PATENT DOCUMENTS

| | | | |
|---|---|---|---|
| 2020/0004543 A1* | 1/2020 | Kumar | G06F 9/3844 |
| 2020/0133679 A1* | 4/2020 | Brandt | G06F 9/3844 |
| 2020/0210197 A1* | 7/2020 | Asanovic | G06F 21/74 |
| 2020/0285476 A1* | 9/2020 | Bolbenes | G06F 9/3848 |
| 2022/0043908 A1* | 2/2022 | Chaffin | G06F 9/3806 |
| 2022/0292183 A1* | 9/2022 | Solomatnikov | G06F 9/30116 |

OTHER PUBLICATIONS

Sparsh Mittal, "A survey of value prediction techniques for leveraging value locality", John Wiley & Sons, Ltd, pp. 1-24 (Year: 2017).*

Whitepaper: Spectre-BHB: Speculative Target Reuse Attacks Version 1.7, Arm, Mar. 2022, 9 pages.

E. Barberis, "Branch History Injection: On the Effectiveness of Hardware Mitigations Against Cross-Privilege Spectre-v2 Attacks", USENIX Security, vol. 11, 2022, 18 pages.

\* cited by examiner

RE-ENABLING USE OF PREDICTION TABLE AFTER EXECUTION STATE SWITCH

BACKGROUND

Technical Field

The present technique relates to the field of data processing.

TECHNICAL BACKGROUND

A data processing system may have a prediction mechanism for determining a prediction used for controlling processing of at least one instruction. For example, the behaviour of one instruction can be predicted and used to control the processing of subsequent instructions before the actual behaviour of the first instruction is known. The predictions can be based on information trained based on previous instruction behaviour seen during program execution. Such prediction mechanisms can help to improve performance.

SUMMARY

At least some examples of the present technique provide an apparatus comprising:
processing circuitry having a plurality of execution states for execution of instructions;
branch history storage to store branch history information indicative of at least one branch property for a sequence of branches;
prediction circuitry to determine a prediction for controlling execution of at least one instruction by the processing circuitry, where the prediction circuitry is configured to determine a first type of prediction based at least on a first prediction table storing prediction information looked up based on at least a first portion of the branch history information corresponding to a first predetermined number of branches; and
prediction control circuitry to:
in response to detecting an execution state switch of the processing circuitry from a first execution state to a second execution state more privileged than the first execution state, disable use of the first prediction table in determining the first type of prediction; and
in response to detecting that a number of branches causing an update to the branch history storage since the execution state switch is greater than or equal to the first predetermined number, re-enable use of the first prediction table in determining the first type of prediction.

At least some examples of the present technique provide a method comprising:
executing instructions using an apparatus comprising processing circuitry having a plurality of execution states for execution of instructions, branch history storage to store branch history information indicative of at least one branch property for a sequence of branches, and prediction circuitry to determine a prediction for controlling execution of at least one instruction by the processing circuitry, where the prediction circuitry is configured to determine a first type of prediction based at least on a first prediction table storing prediction information looked up based on at least a first portion of the branch history information corresponding to a first predetermined number of branches;

in response to detecting an execution state switch of the processing circuitry from a first execution state to a second execution state more privileged than the first execution state, disabling use of the first prediction table in determining the first type of prediction; and
in response to detecting that a number of branches causing an update to the branch history storage since the execution state switch is greater than or equal to the first predetermined number, re-enabling use of the first prediction table in determining the first type of prediction.

At least some examples of the present technique provide a non-transitory computer-readable medium to store computer-readable code for fabrication of an apparatus comprising:
processing circuitry having a plurality of execution states for execution of instructions;
branch history storage to store branch history information indicative of at least one branch property for a sequence of branches;
prediction circuitry to determine a prediction for controlling execution of at least one instruction by the processing circuitry, where the prediction circuitry is configured to determine a first type of prediction based at least on a first prediction table storing prediction information looked up based on at least a first portion of the branch history information corresponding to a first predetermined number of branches; and
prediction control circuitry to:
in response to detecting an execution state switch of the processing circuitry from a first execution state to a second execution state more privileged than the first execution state, disable use of the first prediction table in determining the first type of prediction; and
in response to detecting that a number of branches causing an update to the branch history storage since the execution state switch is greater than or equal to the first predetermined number, re-enable use of the first prediction table in determining the first type of prediction.

Further aspects, features and advantages of the present technique will be apparent from the following description of examples, which is to be read in conjunction with the accompanying drawings.

DESCRIPTION OF EXAMPLES

Figure 1:
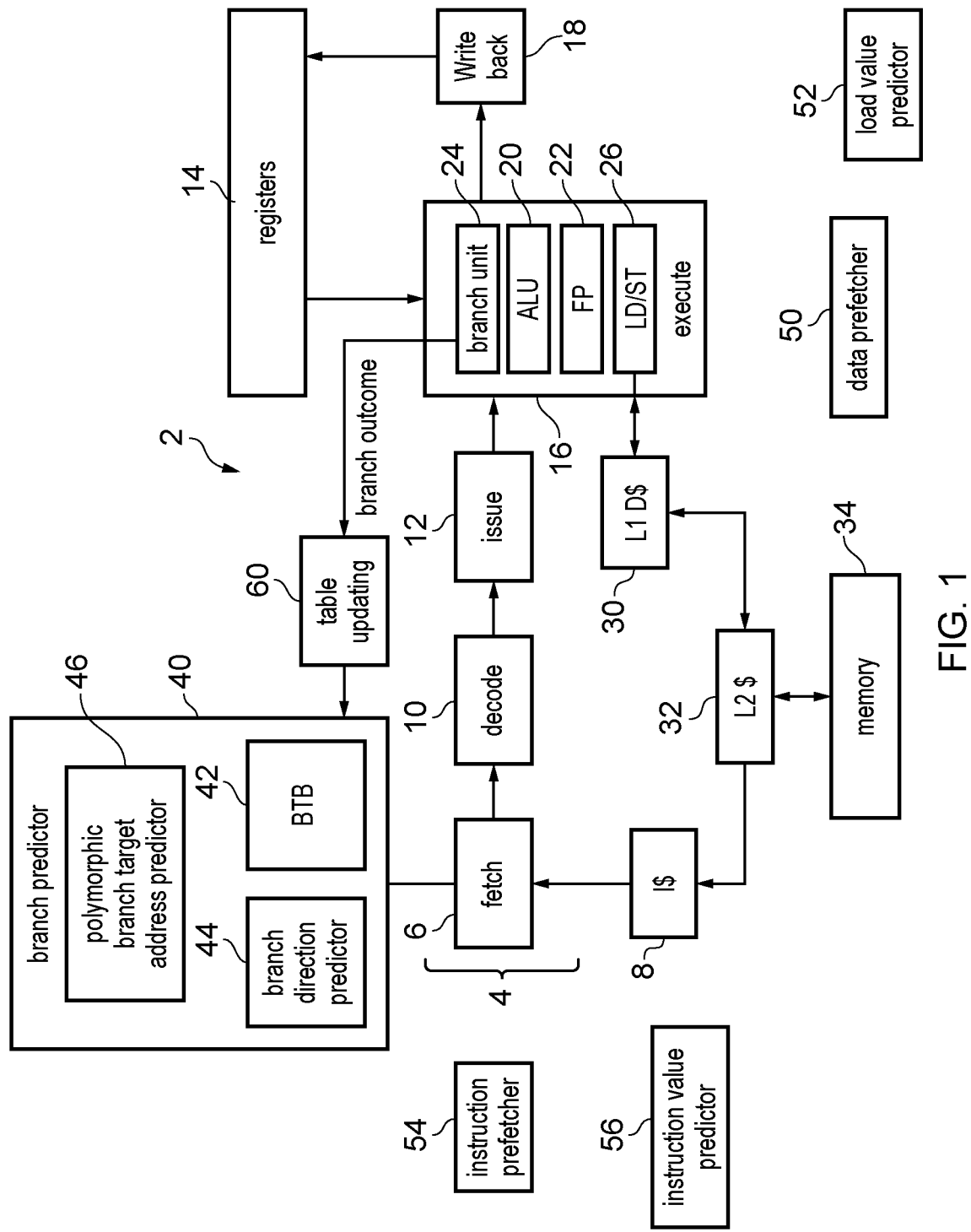
FIG. 1 illustrates an example of a data processing apparatus.

An apparatus has processing circuitry having two or more execution states for execution of instructions; branch history storage to store branch history information indicative of at least one branch property for a sequence of branches; and prediction circuitry to determine a prediction for controlling execution of at least one instruction by the processing circuitry, where the prediction circuitry is configured to determine a first type of prediction based at least on a first prediction table storing prediction information looked up based on at least a first portion of the branch history information corresponding to a first predetermined number of branches. Performing the prediction based on information from a table looked up based on at least a portion of the branch history information can be useful for performance reasons. The same instruction may behave in different ways depending on what other instructions have been executed before that instruction. The branch history information (which indicates branch properties for a sequence of branches) can be used as an indication of the path of program flow that was taken leading up to the instruction being predicted. Hence, by using the branch history information for selecting which entry of prediction information from the first prediction table is used to form the prediction, this enables more accurate prediction of the behaviour expected for the current scenario in which the instruction is encountered.

However, while prediction mechanisms can be useful for performance, in recent years it has been discovered that, in the absence of a suitable defence mechanism, such prediction mechanisms can potentially introduce security vulnerabilities that can be exploited by attackers to gain access to sensitive information. If the attacker can maliciously train the prediction circuitry to generate an incorrect prediction for a given instruction, a number of subsequent instructions may speculatively be executed based on the incorrect prediction, and even if later the prediction is determined to be incorrect and so the architectural effects of the incorrectly executed instructions are then reversed, the incorrectly executed instructions may have caused changes in which addresses have data allocated to a cache, which could be probed by an attacker using cache-timing side-channel methods. It is possible to use this type of attack to leak information about sensitive information which is inaccessible to the attacker's program code but is accessible to victim code executing in a more privileged execution state.

Recently, a new form of this attack has been described which is based on maliciously training the branch history information stored in the branch history storage before an execution state switch from a first execution state to a second execution state more privileged than the first execution state, in an attempt to cause the wrong entry of a prediction table to be selected based on the branch history information when making predictions influencing the execution of instructions of victim code executing in the second execution state after the execution state switch. If the attacker can find parts of the victim code that access secret information and cause those instructions to be incorrectly executed (possibly in a sequence not envisaged by the developer of the victim code) due to the incorrect prediction based on the maliciously trained branch history information, this may affect cache allocation and allow deductions about the secret information to be made based on cache timing side-channels. While relatively difficult to mount, this attack has been demonstrated in practice, even on processor hardware which has hardware-implemented defences against other forms of cache-timing side-channel attacks. This type of attack can be referred to as "branch history injection" (BHI) or "Spectre-BHB".

One approach for defending against a BHI attack could be to clear either the first prediction table or the branch history storage, or both, in response to an execution state switch to a more privileged execution state. However, this may have a negative effect on performance. Another approach can be to ensure that lookup mechanism for looking up the first prediction table uses a more precise tagging mechanism to avoid prediction information allocated for one instruction being accessible when making a prediction for another instruction. However, such a more precise tagging mechanism may be more expensive to implement in terms of circuit area and power consumption (e.g. requiring wider prediction table entries and comparison circuit logic to support a larger number of bits), and so may be less preferred.

In the examples discussed below, where a first prediction table is to be looked up based on a first portion of the branch history information corresponding to a first predetermined number of branches, prediction control circuitry is provided to:
  in response to detecting the execution state switch of the processing circuitry from a first execution state to a second execution state more privileged than the first execution state, disable use of the first prediction table in determining the first type of prediction; and
  in response to detecting that a number of branches for which an update has been made to the branch history storage since the execution state switch is greater than or equal to the first predetermined number, re-enable use of the first prediction table in determining the first type of prediction.

This can avoid the need to implement more precise tagging of prediction information in the first prediction table, but nevertheless defends against the BHI attack because the first prediction table is prevented from being used for determining the first type of prediction until the number of branches for which a branch property has been allocated to the branch history storage since the execution state switch has reached or exceeded the first predetermined number of branches corresponding to the portion of the branch history information that is actually used for looking up the first prediction table. Hence, it can be policed that the branch history information used for the prediction lookup is branch history information allocated since the execution state switch, which removes the opportunity for an attacker executing code in the first execution state to maliciously train branch history information to cause incorrect predictions in the second execution state. This approach to defending against BHI attacks can be better for performance than an implementation which clears the branch history information or first prediction table in response the execution state switch.

For example, there may be occasions when the apparatus executed instructions in the second execution state for only a relatively short period of time before switching back to the first execution states, and so if the period of execution the second execution state is short enough, the branch history storage may still be storing branch history information relating to instructions executed in the first execution state before the switch to the second execution state. This branch history information could be useful for selecting prediction information for the instructions executed after the return to the first execution state, and so can help improve performance by enabling more accurate predictions, but would be lost in an implementation which clears the branch history information in response to the execution state switch to the second execution state.

In response to a return to the first execution state, which occurs after the execution state switch at a time when the number of branches causing an update to the branch history storage since the execution state switch is still less than the first predetermined number, the prediction control circuitry may re-enable use of the first prediction table in determining the first type of prediction. By not clearing the branch history information in response to the execution state switch, but instead temporarily disabling use of the first prediction table for forming the first type of prediction until either the number of branches whose property information is allocated to the branch history storage since the execution state switch reaches or exceeds the first predetermined number, or the processing circuitry returns to the first execution state, this helps to improve performance in comparison to fully clearing the branch history storage in response to the execution state switch.

The first prediction table may not be the only table of prediction information used for generating the first type of prediction. In some examples, the prediction circuitry may determine the first type of prediction based on at least the first prediction table and a second prediction table storing prediction information looked up based on at least a second portion of the branch history information corresponding to a second predetermined number of branches, where the second predetermined number is greater than the first predetermined number. It will be appreciated that the number of tables used to form the first type of prediction may in fact be greater than two and so the first prediction table and the second prediction table can be any two of the prediction tables used to form the first type of prediction. Hence, describing presence of a first prediction table and a second prediction table does not exclude the possibility that there could also be a third prediction table, fourth prediction table, etc., even if those additional prediction tables are not explicitly described.

The prediction control circuitry may, in response to detecting the execution state switch, disable use of the second prediction table in determining the first type of prediction. In response to detecting that the number of branches causing an update to the branch history storage since the execution state switch is greater than or equal to the second predetermined number, the prediction control circuitry may re-enable use of the second prediction table in determining the first type of prediction. Hence, use of the first prediction table for determining the first type of prediction may be re-enabled earlier than re-enabling use of the second prediction table for determining the first type of prediction. This can be useful for performance because, compared to an approach which fully disables speculation based on the first type of prediction altogether until all prediction information used in the first type of prediction can be considered safe, performance recovery after the execution state can be more gradual and allows each type of prediction table to be used as soon as the portion of the branch history information used to look up that prediction table is determined to be safe (when that portion is based exclusively on properties of branches executed after the execution state switch). This avoids the performance penalty of unnecessarily preventing use of the first prediction table while waiting for the branch history information used by the second prediction table to become safe.

In one example, the prediction circuitry determines the first type of prediction based on two or more tagged-geometric prediction tables, including the first prediction table, which are looked up based on respective portions of the branch history information corresponding to successively increasing numbers of branches. The prediction circuitry selects, as the first type of prediction, a prediction based on the tagged-geometric prediction table which, among the tagged-geometric prediction tables currently enabled for use and which detect a lookup hit, is looked up based on a portion of branch history information corresponding to the greatest number of branches. Following the execution state switch, the prediction control circuitry gradually re-enables use of the respective tagged-geometric prediction tables in ascending order of the number of branches corresponding to the respective portions of the branch history information used for looking up the respective tagged-geometric prediction tables.

For some types of prediction, tagged-geometric predictors can be particularly good for performance in comparison to other types of predictor mechanisms. If a hit can be detected in a table looked up based on a longer sequence of branch history, the prediction made is more likely to be accurate than if the prediction is based on a hit detected in a table looked up based on a shorter sequence of branch history, because the longer branch history is less likely to encounter "aliasing" lookups where a hit is detected in the lookup although in fact the predicted behaviour represented by the hit entry does not match the actual behaviour of the instruction for which the prediction is made. However, a table looked up based on a long sequence of branch history is more likely to encounter a miss than a table looked up based on a shorter sequence of branch history, and there may be some instructions whose behaviour does not depend strongly on outcomes of branches executed a relatively long time ago, which might not be able to be predicted well using a table looked up based on a longer sequence of branch history. Therefore, a tagged-geometric predictor balances these competing factors by looking up multiple tables based on different lengths of branch history and forming the prediction based on the table which, out of those tables currently enabled for use and which detect a hit in the lookups, is the table looked up based on the longest portion of branch history. Tagged-geometric predictors can provide better performance than a predictor based on the lookup of a single table based on a single length of branch history. The technique discussed above for protecting against BHI attacks can be particularly useful for tagged-geometric predictors to allow progressive recovery of performance after the execution state switch.

In a tagged-geometric example, the prediction circuitry may also form the first type of prediction based on a base prediction table looked up based on a value which does not depend on the branch history information in the branch history storage at all (e.g. the lookup value for the base prediction table could be derived from a program counter address). The base prediction table can be used as a fallback predictor in case none of the tagged-geometric prediction tables detect a hit. Use of predictions based on the base prediction table may remain enabled after the execution state switch, as they do not depend on the branch history information in the branch history storage and so are not vulnerable to the BHI attacks described above.

The first type of prediction may not be the only type of prediction which depends on the branch history information stored in the branch history storage. The prediction circuitry may also determine a second type of prediction depending on at least a portion of the branch history information. Following the execution state switch, the prediction control circuitry may enable use of the branch history information for determining the second type of prediction, even when use of the first prediction table for determining the first type of prediction is disabled. For example, the second type of prediction may be a form of prediction which is much less likely to be exploited by an attacker to yield information about secret information accessible to the program code executing in the second execution state, and so may be considered safe to proceed after the execution state switch even if based on branch history information allocated based on branches executed in the first execution state before the execution state switch. Therefore, there may be no need to disable use of the branch history information for determining the second type of prediction. This may be another reason why the technique discussed above can be useful for performance in comparison to techniques which clear the branch history information in response to the execution state switch. Even if it helps address a BHI attack based on the first type of prediction, clearing the branch history information would negatively affect performance by also preventing use of the second type of prediction. In contrast, the technique discussed above of disabling use of the first prediction table for a time following the execution state switch allows the BHI attack based on the first type of prediction to be defended against without incurring the performance impact of clearing the branch history information which would reduce prediction accuracy for the second type of prediction.

Following the execution state switch, the prediction control circuitry may enable use of said at least a portion of the branch history information for determining the second type of prediction, independent of the number of branches which have caused an update to the branch history storage since the execution state switch. Hence, it is not necessary to make enabling of the second type of prediction depend on the number of branches for which at least one branch property has been allocated to the branch history storage since the execution state switch. The second type of prediction may remain enabled following the execution state switch regardless of the number of branches encountered since the execution state switch.

In general, the first type of prediction may be any form of prediction which may be considered to pose a vulnerability which could be exploited by a BHI attack, while the second type of prediction may be any form of prediction for which such vulnerability may be unlikely (at least when it is assumed that the first type of prediction is protected against BHI attacks by the technique discussed above).

In one example, the first type of prediction comprises a prediction of a branch target address, and the second type of prediction comprises a prediction of whether a branch is taken or not-taken. Prediction of branch outcome (taken/not-taken) is much less likely to cause a vulnerability that could be exploited by a BHI attack, because, provided the target address prediction is protected against attack, incorrectly predicting a branch taken or not-taken when the actual outcome should have been the opposite would merely result in selecting the wrong path out of two valid options intended to be available for selection by the software developer of the code being executed. In contrast, branch target address mispredictions may be of greater concern as an incorrect branch target address prediction could lead to an entirely different instruction being executed which is not one of the instructions intended by the software developer as valid options to be executed after the branch. Therefore, while the first prediction table (and second or further prediction tables) for determining branch target address predictions may temporarily be disabled after the execution state switch for a time and re-enabled based on monitoring of the number of branches as discussed above, the taken/not-taken predictions may continue to be made based on branch history information allocated in the first execution state. This can be useful for performance reasons because sometimes behaviour of branches in the second execution state may depend on the path executed in the first execution state which caused a system call to the second execution state, and so the branch history information allocated in the first execution state may help to improve prediction accuracy for taken/not-taken branch prediction made in the second execution state.

The apparatus may comprise a branch counter to count a number of branches causing an update to the branch history storage. The prediction control circuitry may reset the branch counter to a reset value (e.g. 0, or any other initial value) in response to detecting the execution state switch. Following the execution state switch, the prediction control circuitry determines, based on the branch counter, whether to re-enable use of the first prediction table in determining the first type of prediction. For example, the first prediction table may be re-enabled when the branch counter value has reached a certain threshold corresponding to the first predetermined number. Similarly, the second prediction table may be re-enabled when the branch counter has reached a certain threshold corresponding to the second predetermined number.

The prediction circuitry may look up the first prediction table based on a hash value derived from a program counter address (an address of an instruction representing a current point of program execution) and the first portion of the branch history information. The hash value may have fewer bits than the total number of bits in the program counter address and the first portion, so that it is possible for different combinations of program counter address and value of the first portion to alias to the same hash value. While this might sometimes lead to incorrect hits on an entry trained for a different instruction or a different sequence of branch history, such incorrect hits may be relatively rare and the hashing approach can greatly reduce the circuit area and power cost of looking up the table compared to a precise hashing approach which avoids any aliasing. However, implementations which use such a hash value could potentially be exploited by an attacker using a BHI attack, based on maliciously training the branch history information so that the hash value derived from a first program counter address and the attacker's trained value of the first portion of the branch history information is the same as the hash value previously derived from a second program counter address and a second value of the first portion of the branch history information when allocating an entry of the first predictor table. The attacker may be able to use this to cause an incorrect prediction to be made, which could allow the instructions in the program code executed in the second execution state to be strung together in ways which were not expected by the software developer of the program code, which could cause security vulnerabilities. By using the approach discussed above of temporary disablement of use of the first prediction table for a time after the execution state switch, but re-enabling use of the first prediction table when the number of branches allocated to the branch history storage since the execution state switch is or exceeds the first predetermined number, this makes it safe to continue using the imprecise hashing approach, so avoids the energy/circuit area penalty that would be incurred for a BHI defence based on fully-tagged prediction entries based on a precise lookup that does not permit aliasing. Hence, the technique discussed above can be particularly useful for implementations which look up the prediction table based on a hash value of the program counter address and the first portion of the branch history information.

In some examples, each entry of the first prediction table is associated with a context identifier distinguishing entries allocated in different execution contexts, where execution contexts corresponding to the first execution state and the second execution state have different context identifiers, and in a lookup of the first prediction table performed for a first execution context, the prediction circuitry detects a miss for a given entry of the first prediction table when a mismatch is detected between the context identifier for the given entry and a context identifier associated with the first execution context. This can provide a further defence against other variants of speculation-based cache-timing attacks not based on branch history injection. Other defences to those variants of attacks are also possible (e.g. based on preventing use of speculatively allocated cached information for a time after a switch from a more privileged execution state back to a less privileged execution state). Hence, the selective disabling of prediction resources described above for addressing the BHI attack need not be the only form of defence provided. A wide variety of other defences are possible for dealing with other variants of speculation-based cache-timing attacks (including defences based purely in software and not requiring hardware protection).

The branch history storage may update the branch history information for the sequence of branches based on a first-in-first-out (FIFO) policy. For example, the branch history storage may operate as a circular buffer, where (if there is no empty location available) the property for the latest branch allocated to the history storage overwrites the property for the branch least recently allocated to the branch history storage, with a pointer being used to track the location in the buffer to which the next piece of branch history information is to be allocated. Alternatively, allocation of new branch history information may be made to the same location in the buffer every time, but on each allocation the previous contents of the buffer are shifted up one position to evict the least recently allocated entry which is shifted out at the other end of the buffer from the end at which the new information is inserted.

It is not necessary to update the branch history storage for all branches encountered. In some examples, only a subset of branches may cause an update to the branch history storage. The sequence of branches tracked by the branch history storage may therefore be the most recent sequence of branches which meet the criteria for allocating to the branch history storage, rather than the most recent sequence of branches per se. For example, the selection of whether to allocate a particular branch to the branch history storage may be based on branch type or branch alignment (the relative offset of the branch instruction address relative to an alignment boundary).

Hence, in response to a newly encountered branch, the branch history storage updates a given location of the branch history storage based on the at least one branch property of the newly encountered branch, where that given location is selected independent of a program counter address of the newly encountered branch. Hence, the branch history information stored in the branch history storage may be considered an indication of "global" branch history—a property reflecting the overall behaviour of the program being executed as it traverses a path of program flow across multiple branches. This may differ to "local" branch history maintained in an prediction table looked up based on a value derived from a program counter address of the branch, where the program counter is used to distinguish which of several entries relates to the program counter address for the branch being looked up.

The branch history information in the branch history storage may provide a branch history value which depends on the order in which the branches having the respective branch properties were encountered.

The at least one branch property allocated to the branch history storage for each of the branches can vary between different implementations. For example, the at least one branch property could be a taken/not-taken outcome for the given branch, or a branch target address for the given branch, or a combination of (or hash value derived from) the taken/not-taken outcome and branch target address, and/or another property of each branch.

The techniques discussed above can be used for any type of prediction which is based on a prediction table looked up based on the branch history information, which could potentially be vulnerable to BHI attacks.

For example, one particularly useful form of prediction that could be protected using the mechanisms discussed above can be where the first type of prediction comprises branch target address prediction. More particularly, the first type of prediction may comprise polymorphic branch target address prediction, where the first prediction table supports two or more entries being allocated to provide two or more different target addresses corresponding to the same branch instruction but different values of the first portion of the branch history information. Polymorphic branch target address prediction can be useful for more complex branches whose target address may be data-dependent and so one instance of executing the branch may calculate a different target address to another instance. A hash of the program counter address of the branch with a portion of branch history information can be a way of distinguishing the scenario in which a given branch is encountered in a given program, and so allow different entries for different target addresses to be distinguished, but this opens an opportunity for an attacker to modify the branch history information in such a way that an entry allocated for one program counter address may be used to provide a prediction for a different branch having a different program counter address due to aliasing of the hash values as discussed above—this can be exploited in a BHI attack. The technique of selecting when to re-enable use of the first prediction table based on the number of branches encountered since the execution state switch as discussed above can therefore be particularly useful for polymorphic branch target address predictions.

However, the techniques discussed above can also be used for types of prediction other than branch predictions. Prediction of instruction behaviour for non-branch instructions can nevertheless depend on a lookup based on branch history information, so could potentially be vulnerable to branch history injection attacks. Such predictions could cause incorrect speculative execution which can cause cache allocations/evictions which can be probed with cache timing measurements, potentially leaking sensitive information. The defence mechanisms discussed above can therefore be useful for such other types of predictions. For example, the first type of prediction could comprise a prefetch prediction for determining data or instructions to be prefetched into a cache, or a value prediction to predict a value of data or instructions to be loaded from memory.

Specific examples are now described with reference to the drawings.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example, in an out-of-order processor a register renaming stage could be included for mapping architectural registers specified by program instructions or micro-operations to physical register specifiers identifying physical registers in the register file 14.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a branch unit 24 for evaluating the outcome of branch operations and adjusting the program counter which represents the current point of execution accordingly; and a load/store unit 26 for performing load/store operations to access data in a memory system 8, 30, 32, 34.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness.

As shown in FIG. 1, the apparatus 2 includes a branch predictor 40 for predicting outcomes of branch instructions. The branch predictor is looked up based on addresses of instructions provided by the fetch stage 6 and provides a prediction of whether those instructions are predicted to include branch instructions, and for any predicted branch instructions, a prediction of their branch properties such as a branch type, branch target address and branch direction (predicted branch outcome, indicating whether the branch is predicted to be taken or not taken). The branch predictor 40 includes a branch target buffer (BTB) 42 for predicting properties of the branches other than branch direction, and a branch direction predictor (BDP) 44 for predicting the not taken/taken outcome (branch direction). The branch predictor 40 also includes a polymorphic branch target address predictor 46 for predicting the target address of certain more-complex-to-predict branches which can have different target addresses on different instances of executing the branch. In contrast, the BTB 42 may be a simpler structure which records a single predicted target address per branch. One of the branch properties predicted by the BTB 42 could include a prediction of whether the target address for a given branch is better predicted using the polymorphic branch target address predictor 46 or whether the BTB prediction of the target address is sufficient. It will be appreciated that the branch predictor could also include other prediction structures, such as a call-return stack for predicting return addresses of function calls, a loop direction predictor for predicting when a loop controlling instruction will terminate a loop, or other more specialised types of branch prediction structures for predicting behaviour of outcomes in specific scenarios. The various components 42, 44, 46 of the branch predictor maintain tables of branch prediction state used to generate their predictions. Table updating circuitry 60 may update these tables based on branch outcomes (e.g. taken/not-taken, and target address) determined by the branch unit 24 for executed branch instructions.

The apparatus 2 could also have other types of prediction circuitry, such as a data prefetcher 50 for predicting addresses of data likely to be requested from the memory system 30, 32, 34 by the load/store unit 26 in response to instructions, and prefetching data into the caches 30, 32 from memory 34 in advance of such requests to reduce access latency, and/or a load value predictor 52 which predicts the data value of data being loaded from the memory system 30, 32, 34 before the data is actually returned, so that subsequent instructions can be executed speculatively based on the predicted data value. Similarly, on the instruction side, an instruction prefetcher 54 and/or instruction value predictor 56 can be provided to predict the addresses and encodings of instructions to be fetched by the fetch stage 6.

For all of the prediction structures 40, 50, 52, 54, 56 shown in FIG. 1, if a prediction is correct, this will tend to improve performance by allowing other operations performed speculatively based on the prediction to be performed earlier. If the prediction turns out to be incorrect, the pipeline can be flushed of instructions which are potentially affected by the misprediction (e.g. the pipeline can be flushed of instructions from a point of program order at or after the mispredicted instruction) and processing may resume from a safe point of execution. Provided the mispredictions are sufficiently rare, processing performance as a whole may be faster despite the occasional misprediction. The table updating circuitry 60 can learn from previous mispredictions to adjust the prediction state used by the prediction structures to improve the likelihood of predictions being correct in future. While table updating circuitry 60 is shown explicitly only for the branch predictor, it will be appreciated that the other prediction structures may have similar circuitry for updating the prediction state used to make the predictions (in the case of the data prefetcher 50, based on data access addresses calculated by the load/store unit 26 for executed instructions; for the load value predictor 52 based on the data values returned for load operations; for the instruction prefetcher 54 based on the fetch addresses calculated for the instructions being fetched by the stage 6; and for the instruction value predictor 56 based on the loaded encodings of the fetched instructions).

Figure 2:
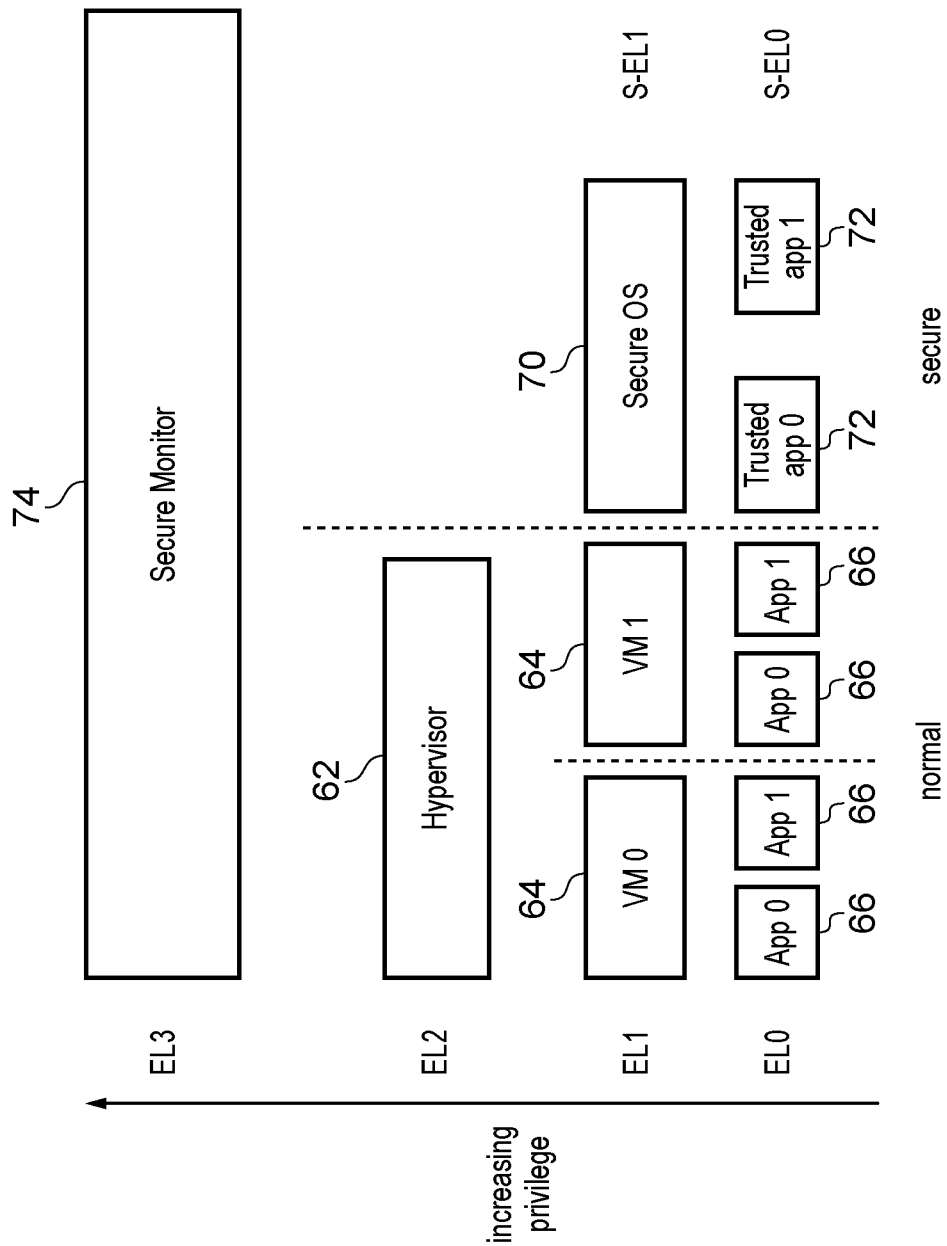
FIG. 2 illustrates an example of various execution states of processing circuitry.

FIG. 2 schematically illustrates an example of processes which can be executed by a data processing apparatus in a number of execution states EL0, EL1, EL2, EL3, S-EL0, S-EL1 associated with different levels of privilege. A hypervisor 62 may manage a number of virtual machines (VMs, also known as guest operating systems or guest OS) 64. Each VM 64 may manage one or more applications 66. For example the hypervisor 62 may control which regions of an address space are allocated to each virtual machine 64 and control switching between the virtual machines 64, e.g. scheduling interrupts to time share processing resource between the respective virtual machines 64. Similarly, each VM 64 may control which regions of the address space are allocated to each application 66 executing under that VM 64, and may control switching between the applications as required.

As shown in FIG. 1, each process is associated with a given privilege level as determined by the execution state EL0, EL1, EL2, EL3 in which the process is executed. In this example higher numbered privilege levels are more privileged than lower numbered privilege levels, although the numbering scheme could be the other way round in other examples. In this example, the applications 66 execute at privilege level EL0, the VMs 64 execute at privilege level ED and the hypervisor 62 executes at privilege level EL2. Typically, a process executing at a higher privilege level has rights not available to a process executing at a lower privilege level.

As shown in FIG. 1, the hypervisor 62, VMs 64 and apparatus 66 may operate in a normal domain. In addition, the apparatus may support a secure domain which is partitioned from the normal domain so that processes executing in the normal domain cannot access data or instructions associated with the secure domain. Hence, there may also be processes running in the secure domain, such as a secure operating system (OS) 70 and trusted applications 72 executing in the secure domain under control of the secure OS 70. The secure OS 70 and trusted applications 72 execute at privilege levels S-EL1, S-EL0 respectively. While FIG. 2 does not show it, some implementations may also provide a secure hypervisor running in a "secure EL2" execution state (others may manage the secure OS 70 from the secure monitor code 74 at EL3 without an intervening secure hypervisor, so those systems may not have a secure EL2 execution state). The secure monitor process 74 also provided at privilege level EL3 to manage transitions between the normal domain and the secure domain. The secure monitor process 74 may for example manage which regions of the address space are associated with the secure or non-secure domains, with some protection hardware being provided to prevent non-secure processes in the normal domain accessing data or instructions within the secure regions. An example of a technique for partitioning the normal and secure domains is the Trustzone® technique provided by ARM® Limited of Cambridge, UK, although other examples could also be used. The provision of a secure domain as shown in FIG. 2 is optional and other embodiments may not support the execution states for supporting the secure monitor 74, secure OS 70 and trusted applications 72 for example.

Hence, the processing circuitry has a number of execution states (e.g. corresponding to the combination of the exception level (EL) and security state (normal/secure domain)), which affects a level of privilege granted to instructions executing in those states. For example, the execution state may determine which types of instructions can be executed, which registers are readable, which registers are writable, and which memory locations can be read/written. The secure domain can be regarded as more privileged than the normal domain, and higher exception levels can be regarded as more privileged than lower exception levels. In general, software executing in a more privileged state may have access to some data not accessible to a less privileged state, either due to an inherent hardware-implemented control mechanism (not programmable based on software) which is controlled based on the current execution state according to rules defined in an instruction set architecture (e.g. an architectural restriction that a certain register is inaccessible in a certain execution state), or based on software-controlled information, such as page table permissions set in page tables to deny access to a certain memory address space region to a process executing at a less privileged state, with the enforcement of the page table permissions set by software being controlled in hardware by a memory management unit for example.

Figure 3:
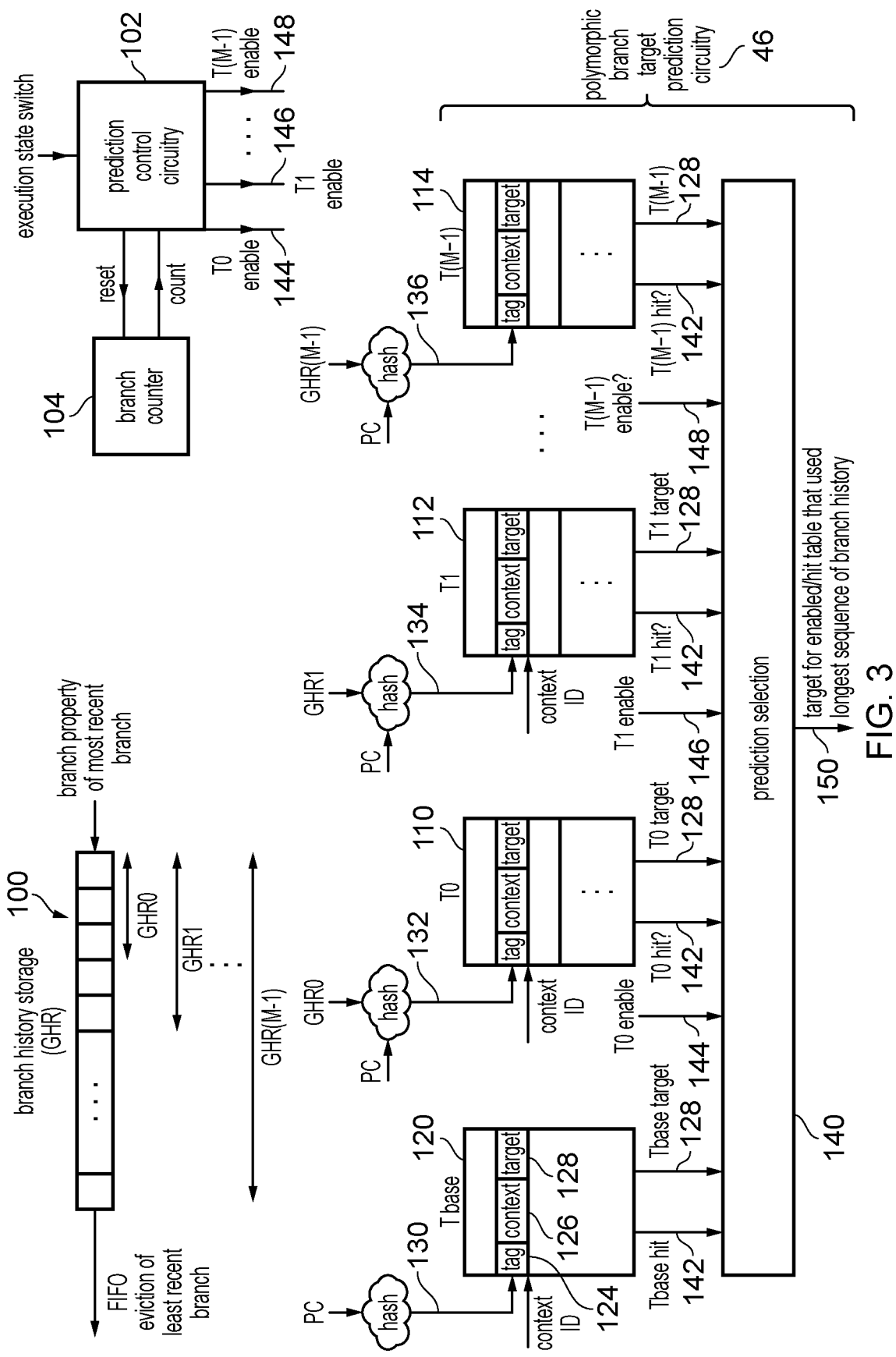
FIG. 3 illustrates branch history storage, prediction circuitry and prediction control circuitry.

FIG. 3 illustrates a portion of the apparatus of FIG. 1 in more detail, showing polymorphic branch target prediction circuitry 46 (which is an example of the prediction circuitry mentioned earlier), branch history storage 100 and prediction control circuitry 102 which controls the operation of the polymorphic branch target prediction circuitry 46 with reference to a branch counter 104.

The branch history storage 100 is a record of branch properties of the N most recently encountered branches meeting any conditions required for allocation to the branch history storage (where N is a certain integer). In some examples, all branches may be considered to meet those conditions, in which case the branch history storage 100 simply tracks the most recent N branches. However, in other examples some other allocation conditions may be applied—e.g. limiting which types of branches are allocated to the branch history storage, in which case the N branches in the branch history storage 100 may be the most recent N branches meeting the allocation conditions. Each time a branch meeting any conditions required for allocation is encountered, a value derived from one or more properties of the executed branch is written to the branch history storage in the next available entry. Although it is possible to update the branch history storage 100 based on actual branch outcomes derived by the branch unit 24 in the execute stage 16 of the pipeline 4, in practice the branch predictor may be operating a number of cycles ahead of execution at the execute stage 16, and so to more accurately predict branch properties of a given branch based on behaviour of preceding branches which may not yet have reached the execute stage 16, the update of the branch history storage 100 can be based on predicted branch properties of recently encountered branches which are based on earlier predictions of the branch predictor 40 and which may not yet have been verified as correct. If a branch misprediction is detected, the branch history storage 100 can be flushed of information allocated for the mispredicted branches and younger branches.

The branch history storage operates in a first in first out (FIFO) manner, and so if there is no invalid entry available for allocation, then the branch property value written for the latest branch causes eviction of the branch property value for the least recent branch tracked in the branch history storage 100. For example, the branch history storage can be operated as a circular buffer where a pointer indicates the next entry to be updated and the pointer is advanced each time a new branch is encountered, so that writing of information for a new branch may overwrite the information for the least recently allocated branch. Alternatively, the branch property could always be written to a predetermined location and the previous contents of the branch history storage can be shifted up one position causing the information for the least recent branch to be shifted out and discarded. Hence, there can be a number of different ways of implementing the circuitry for tracking the branch history, but in general branch history information indicating at least one branch property per branch is maintained for a sequence of branches, in a manner such that a value derived from the at least one branch property is separately represented for each of those branches and maintained in an order which corresponds to the order in which those branches are encountered in the program flow.

The particular branch property used as the information updated in the branch history storage for a given branch can vary. In some examples, the branch property is the taken/not-taken outcome of the branch. In other examples, the branch property is a target address of the branch (the address to which the branch causes program flow to be diverted when the branch is taken). In some cases, both of these properties may be combined to form a value to be written to the branch history storage for the branch. Other properties could also be considered. However, in a relatively simple implementation, the branch property could simply be the taken/not-taken outcome of the branch so that the branch history storage provides a series of bits of one and zero indicating the pattern of taken/not-taken outcomes for the most recent N branches meeting the requirements for allocation to the branch history storage.

The branch history storage 100 can also be referred to as a global history register (GHR) because it provides a measure of the overall program flow through a program being executed, rather than attempting to track state for any particular branch at a given program counter address. Hence, which location of the branch history storage is updated for the latest branch encountered in program flow may be independent of the program counter address of that latest branch. This differs from other tables of branch prediction state which may be maintained for the branch prediction components such as the BTB 42, branch direction predictor 44 and polymorphic branch target prediction circuitry 46, since such tables may typically be looked up based on a value derived from the program counter address, and when the table is updated by the table updating circuitry 60 based on the branch outcome derived for a particular executed branch, the table updating circuitry 60 will select a particular entry to update based on the program counter address of that branch. Hence, the prediction tables used by components 42, 44, 46 may be tables of local branch history comprising entries which each relate to behaviour for a specific branch having a specific target address (or a block of branches in a certain region of the address space), in contrast to the global history in branch history storage 100 which is tracking a history of branches for the program as a whole, regardless of which particular branches (at any particular program counter addresses) were executed. The branch history information maintained the branch history storage 100 can be useful as information for deriving a value for looking up the local history tables maintained by the branch predictor components 42, 44, 46, so that an entry specific to a recent pattern of branch outcomes can be selected and so different paths of program flow to the same branch can be distinguished to make different predictions depending on the particular route taken through the program to arrive at the branch being predicted. This can be particularly useful for the polymorphic branch target prediction circuitry 46 and the branch direction predictor 44, in comparison to the BTB 42, since the BTB 42 may be used for predicting static properties of simpler branches (e.g. branch type, which depends solely on the branch instruction encoding, or target addresses of simpler branches which always jump to the same target address).

In this example, the polymorphic branch target prediction circuitry 46 is a tagged-geometric (ITTAGE) predictor, which forms a prediction of the branch target address for an instruction at a given program counter address (or, in some implementations, predicts the branch target address of the first taken branch in a region of addresses corresponding to the given program counter address, if lookups are grouped by instruction address region). The prediction is based on multiple tagged-geometric prediction tables 110, 112, . . . 114 and a base prediction table 120. There are M tagged-geometric prediction tables in total (where M is any integer greater than 1)—FIG. 3 only shows 3 of the tagged-geometric prediction tables for conciseness. In each table 120, 110-114, there are a number of prediction entries, each specifying a tag value 124, a context identifier 126 and a predicted target address 128 (other information not shown in FIG. 3 could also be specified by each entry).

The tables 120, 110-114 are looked up based on different lookup values 130, 132, 134, 136 respectively, each lookup value 130-136 being derived from a different combination of information. For the base table 120, the lookup value 130 is based on a hash of the program counter address of the instruction or instruction block for which the prediction is being made. For each of the tagged-geometric prediction tables 110, 112, . . . , 114, the lookup value 132, 134, 136 is based on a hash of the program counter address with respective portions GHR0, GHR1, . . . , GHR(M−1) of the branch history information stored in the branch history storage 100. The respective portions GHR0 to GHR(M−1) of branch history information are of successively increasing length (corresponding to successively greater numbers of recent branches). Hence, portion GHR0 used for table T0 110 corresponds to a certain number X1 of branches, portion GHR1 used for table T1 112 corresponds to a certain number X2 of branches (where X2>X1), and so on until portion GHR(M−1) used for table T(M−1) 114 corresponds to a number X(M−1) (greater than X1, X2, etc.) of branches (typically the number of branches represented by the entire contents of the branch history storage 100). If the branch history storage 100 is operated as a circular buffer, the start point for reading each portion of branch history is the point indicated by the buffer pointer as representing the location storing the information for the least recently allocated branch, and the portions of branch history read out may wrap around the beginning of the buffer if the required portion of branch history is longer than the portion between the pointer-indicated location and the end of the buffer. Alternatively, it may be simpler to operate the branch history storage 100 as a shift register which shifts all previously allocated branch history information up one position when new information is inserted into the storage 100—in the case of using a shift register, the portion to be read out for hashing in the lookup of each tagged-geometric table 110, 112, 114 can start from the same location in the buffer each cycle, rather than needing to read a pointer value. Nevertheless, both implementations are possible.

Hence, each of the tables 120, 110, 112, 114 is looked up based on its corresponding lookup value 130, 132, 134, 136. The lookup of each table 110, 112, 114, 120 depends on both a context identifier comparison and a tag comparison, with the comparisons performed on one or more entries of each table. The number of entries looked up in a given one of the tables depends on the lookup scheme used for that table. For a direct-mapped scheme only a single entry of the given table needs to be looked up, with the entry to use selected based on a portion of the lookup value and the tag 124 compared with a remaining portion of the lookup value. For a set-associative scheme, a set of two or more entries of the given table (not all the entries) is selected based on a portion of the lookup value and the tag 124 of those entries is compared with a remaining portion of the lookup value. For a fully-associative scheme, all the entries of the given table are looked up, and the lookup value 130, 132, 134, 136 is compared with the tag value of all entries of the given table.

The context identifier comparison compares a current context identifier identifying the current execution context with the context field 126 of each looked up entry. The context field 126 is set based on the current context in which instructions are being executed at the time the entry is allocated by table updating circuitry 60. The current context identifier used for the lookup is based on the current context at the time of the lookup. These context identifiers could for example be an indication of the exception level EL, or a context identifier (e.g. thread identifier, address space identifier or virtual machine identifier, or a combination of more than one identifier) identifying a specific execution context such as one of the hypervisor 62, secure monitor 74, VMs 64, secure OS 70, or applications 66, 72.

Hence, for a given table lookup, a hit is detected when one of the looked up entries encounters both a tag match in the tag comparison and a context match in the context comparison. An entry that encounters only one of the tag match and the context match but does not have a match for the other of the tag and context comparisons is detected as missing against the lookup. Filtering lookups based on the context comparison can be useful to protect against some variants of speculative side-channel attacks such as Spectre, by preventing entries allocated for one context being used to provide predictions for another (possibly more privileged) context.

For each table 120, 110, 112, 114, the predicted target address 128 specified by an entry for which a hit was detected (if any) is provided to prediction selection circuitry 140, together with a hit indication 142 indicating whether any hit was detected in the lookup of the corresponding table. The prediction selection circuitry 140 also receives enable signals 144, 146, . . . , 148 corresponding to each tagged-geometric prediction table 110, 112, . . . , 114, indicating whether predictions based on the corresponding tagged-geometric prediction table are enabled. The generation of these enable signals 144, 146, 148 is described further below. The base prediction table 120 can be considered to be always enabled, so there is no corresponding enable signal for the base prediction table 120.

The prediction selection circuitry 140 selects a target address from among the predicted target addresses 128 output by the tables 120, 110, 112, . . . 114. Any tables which did not generate a hit or which are currently disabled are discounted from the selection, so only target addresses output by enabled tables which generated a hit in the lookup can be selected as the target address prediction 150 output by the polymorphic branch target prediction circuitry 46. Among those tables which are both enabled and encountered a hit, the selection circuitry 140 selects the target address output by the one of the enabled/hit tagged-geometric tables that was looked up based on the longest sequence of branch history, and if none of the enabled tagged-geometric tables detect a hit, and the base prediction table 120 provided a hit, then the target address 128 output by the base prediction table 120 is selected. Hence, the order of preference for selecting the prediction is:

select the target address 128 predicted by the longest-history-sequence tagged-geometric table 114, T(M−1), if tagged-geometric table T(M−1) is enabled and detected a hit;

if tagged-geometric table T(M−1) 114 did not detect a hit or was disabled, select the target address 128 predicted by the next longest-history-sequence tagged-geometric table T(M−2), if tagged-geometric table T(M−2) is enabled and detected a hit;

and so on for each successive table looked up based on the next shortest sequence of history . . .

if tagged-geometric table T2 did not detect a hit or was disabled, select the target address 128 predicted by the second-shortest-history-sequence tagged-geometric table T1 112, if tagged-geometric table T1 is enabled and detected a hit;

if tagged-geometric table T1 did not detect a hit or was disabled, select the target address 128 predicted by the shortest-history-sequence tagged-geometric table T0 110, if table T0 is enabled and detected a hit;

if tagged-geometric table T0 did not detect a hit or was disabled, and the base prediction table 120 detects a hit, select the target address 128 predicted by the base prediction table 120.

if none of the tagged-geometric tables T0 . . . T(M−1) are both enabled and output a hit, and the base prediction table 120 did not detect a hit, then no target address prediction is possible using predictor 46. The branch predictor 40 can either fall back on a target address prediction made by the BTB 42, or if no target address prediction is available at all, can predict that any branch, if present, would be not-taken and so allow the fetch stage 6 to continue to fetch instructions sequentially.

The tagged-geometric approach is useful because a table looked up based on a single branch history would have to compromise on the length of branch history 100 used for the lookup. If the length of branch history is too short, the predictor may not be able to distinguish different outcomes for the same branch which follow different patterns of branch history preceding the branch which share the same pattern for the shorter sequence of immediate branch history corresponding to the length of the history portion used for the lookup, but which differ in branch properties for branches further away in time which could have been distinguished using a portion of the branch history 100 not used in the short branch history portion used for the lookup. If the length of branch history used for the lookup is too long, while occasionally the longer branch history sequence can help to more accurately predict branches whose output depends on branches a longer time ago, other branches which depend only on more recent branches may fail to be predicted accurately because of irrelevant differences in branch properties recorded in the portion of the branch history storage 100 used for the lookup relating to branches which are less recent. By providing tables looked up based on branch history portions of different lengths, and choosing the prediction corresponding to the longest sequence of branch history that causes a hit to be generated in the tagged-geometric table 110-114, and falling back to the base prediction table 120 if none of the tagged-geometric tables generates a hit, then this enables much greater prediction accuracy as it enables both branches which depend only on very recent branch history and branches which depend on less recent branch history to be predicted based on the different prediction tables 110-114, 120.

As discussed above, the execution states of the processing circuitry 4 may be assigned different privileges and the privilege-based control mechanism may be used to restrict access to certain secure resources (e.g. program code or data in memory) to prevent, for example, user code executing at EL0 from accessing kernel resources associated with an operating system executing at EL1. In recent years, a type of security attack (commonly known as Spectre) has been described which attempts to gain access to the kernel resources from user code operated by an attacker, by exploiting the property that the effects of speculatively executed instructions (e.g. instructions executed speculatively after a branch prediction) may persist in the cache even after any architectural effects of the speculatively executed instructions have been reversed following a misspeculation. A number of variants of such attacks have been described. Such attacks may train branch predictors or other speculation mechanisms to trick more privileged code into speculatively executing a sequence of instructions designed to make the privileged code access a pattern of memory addresses dependent on sensitive information, so that less privileged code which does not have access to that sensitive information can use cache timing side-channels (measurements of the time taken to access data/instructions for various memory addresses) to probe which addresses have been allocated to, or evicted from, the cache by the more privileged code, to give some information which could allow the sensitive information to be deduced. Some initially proposed variants of the Spectre attack were based on the fact that many branch predictors share prediction state entries between less privileged and more privileged execution contexts, so that a branch in a more privileged execution context may have its target address predicted based on a prediction state entry trained based on branches executed and a less privileged execution context, so that the more privileged branch is mispredicted and causes instructions to be executed from an incorrect branch target address causing an attacker-controlled "gadget"—code designed to expose the sensitive information—to be executed in the more privileged execution context to cause information with an address dependent on the sensitive information to be allocated into the cache. A number of hardware and software mitigations against such attacks are possible, but one defence is as shown in FIG. 3, to tag prediction state entries with the context identifier 126 and to perform a context identifier comparison between a context identifier of the current execution state of the processing circuitry 4 and the context identifier tagged for a given branch prediction state entry, so that a hit is detected only when the context identifiers match. This avoids branch prediction state trained by the attacker's user-level program code at EL0 being used to predict target addresses for branches in kernel-level program code at ED.

However, recently a new variant of the Spectre attack is being published, referred to as Spectre-BHB or "branch history injection" (BHI), which exploits the branch history register 100 to influence the indirect prediction of target addresses of polymorphic branches in kernel-level program code (code at EL1), to cause one branch in the ED program code to be incorrectly predicted as using the target address of another branch of the ED program code, which while a legitimate target for that other branch would not be a safe target for the first branch.

Figure 4:
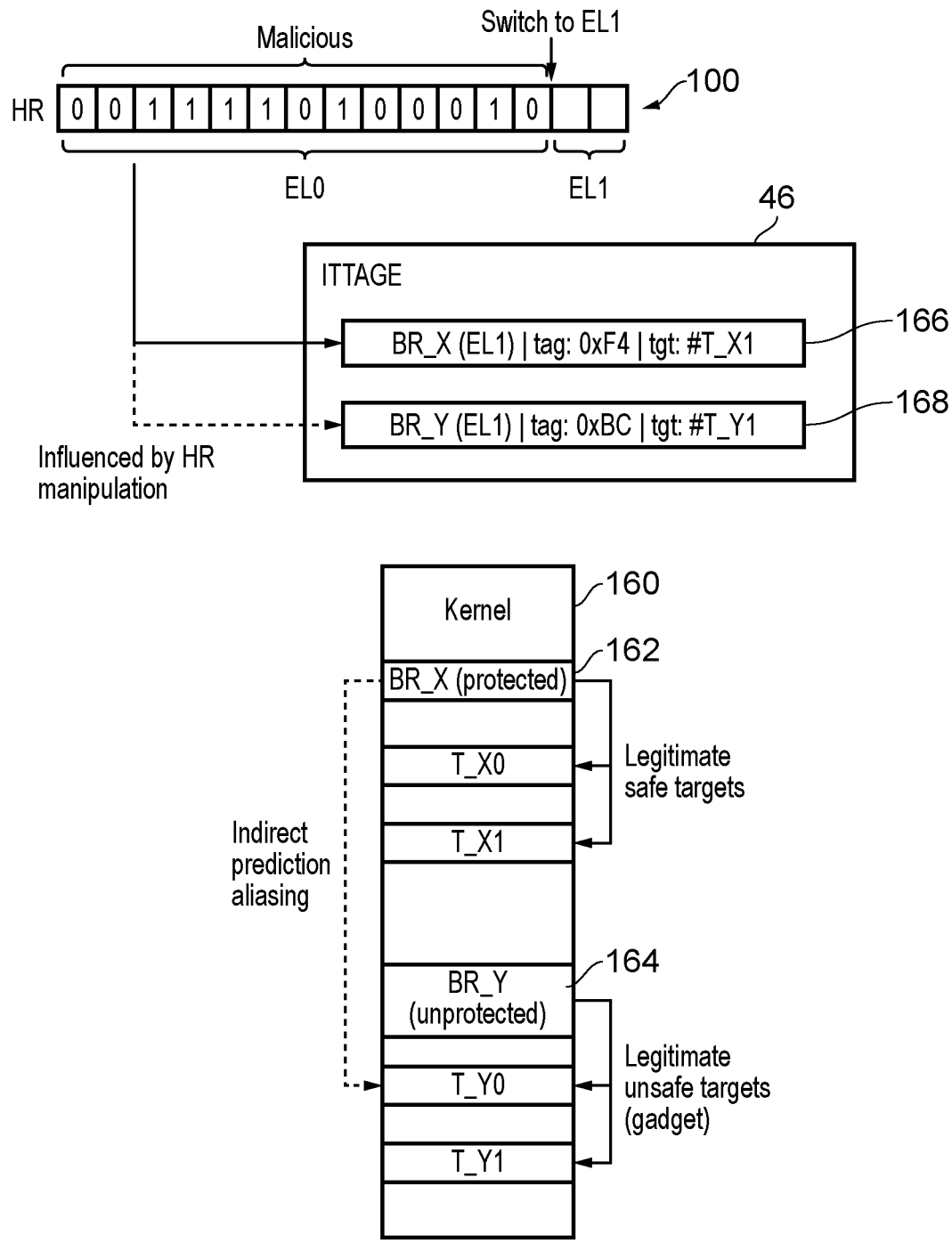
FIG. 4 illustrates an example of an attack based on branch history injection.

FIG. 4 schematically illustrates an example of this attack. The kernel code 160 includes a number of branches including branch X (BR_X) 162 and branch Y (BR_Y) 164. Branch X is a branch expected to be executed relatively shortly after an entry point into kernel code 160 from user-level code operating at EL0, and so is protected by surrounding the branch with some other instructions designed to reduce the likelihood of attacks like Spectre (e.g. as branch X 162 is considered relatively vulnerable given its proximity to the entry point from user-level code, the branch X 162 may be associated with a speculative barrier instruction to prevent subsequent instructions being speculatively executed based on the branch outcome, to prevent cache allocation of information following the branch until the correct branch outcome has been resolved). However, the performance cost of providing such protections for every branch of the kernel-level code 160 may be too high and so other branches, such as branch Y, which are not expected to be executed shortly after the entry point from user-level code, may be unprotected. Hence, the branch X 162 may have a number of legitimate safe target addresses, T_X0 and T_X1, which the polymorphic branch target prediction circuitry 46 can learn to predict through training based on previous outcomes of executing branch X 162, but the legitimate target addresses T_Y0 and T_Y1 of branch Y 164 may be considered legitimate unsafe target addresses as branch Y is not associated with the same protections as branch X.

As shown at the top of FIG. 4, the polymorphic branch target prediction circuitry 46 may have been trained, based on legitimate execution of instructions from the kernel-level code 160, to allocate a prediction entry for branch Y with a certain value, e.g. 0xBC, of the tag 124 (computed based on the hash of the PC of branch Y and a pattern of branch history from register 100). This entry is tagged with the ED context identifier and specifies a predicted target address 128 of T_Y1, which is one of the legitimate targets of branch X. Similarly, the legitimate training of the polymorphic branch target prediction circuitry 46 causes another entry to be allocated for branch X, tagged with the a1 context identifier, a tag value, e.g. 0xF4, (derived from the PC of branch X and a pattern of branch history from register 100 that was seen preceding branch X) and the predicted target address of T_X1, which is again one of the legitimate targets of branch X.

However, the attacker controls the user-level code operating at EL0 to execute a software routine designed to cause a sequence of branches with a certain pattern of branch properties (e.g. pattern of taken/not-taken outcomes and/or target addresses) to be executed, which causes the history register 100 to be filled with the corresponding sequence of branch properties, so that when the attacker code at EL0 makes a supervisor call to trigger a switch to the kernel-level code operating at EL1, the lookup of prediction state performed for branch X 162 of the kernel level code executed soon after the supervisor call is based on a hash value 132, 134, 136 derived from a portion of branch history, a significant portion of which is based on outcomes of branches executed in the attacker's code at EL0. If the attacker can carefully control the sequence of branch properties allocated to the history register, the attacker can cause the hash value 132, 134 or 136 generated based on the PC of branch X and the EL0-allocated sequence of branch history in register 100 to match the tag value 0xBC in the entry 168 allocated in the prediction tables 110-114 for branch Y, causing the unsafe target address T_Y1 to incorrectly be predicted as the target address of branch X (even if a few of the branches used in that portion of branch history are branches executed in a1 after the execution switch, if those branches tend to have relatively consistent outcomes then the lookup will be more influenced by the behaviour in EL0 than in a1 around the execution state switch). By causing the kernel-level code to execute in a sequence not expected by the developer of the kernel-level code, the kernel-level code's own instructions could be used as a gadget by the attacker to cause sensitive information not directly accessible to the attacker to be accessed based on the kernel's level of privilege. This may leak information to the attacker if addresses dependent on that sensitive information are allocated to the cache and the addresses allocated to the cache subsequently be probed by cache timing measurements.

As this misprediction is based on a lookup for one branch hitting against an entry allocated for another branch in the same execution state, the context identifier comparison using context tag 126 would not detect any mismatch. While this may be a more sophisticated attack which is harder to mount by an attacker than the originally disclosed Spectre variants, because it relies on the attacker finding existing vulnerable code within the kernel-level program code which is a valid branch target for some branches of the kernel code but could incorrectly be executed following a branch misprediction of another branch of the kernel code (rather than the attacker being able to force execution of arbitrary attacker supplied code), and on the gadget at the incorrect target address being such that it is exploitable to leak sensitive information, this attack has been demonstrated in practice.

One approach to defending against this attack could be to use full tagging of the entries in the prediction circuitry 46 based on the PC address of the looked up branch, rather than using a hash 132, 134, 136 of the PC with fewer bits which permits aliasing where different PCs can map to the same hash/tag values. However, more precise tagging would incur a significant circuit area penalty because each entry of the prediction tables would have to be much larger (as well as having wider comparison logic for the tag comparisons).

Another approach can be to remove the global history input into the hash used to generate the lookup value (effectively predicting the target address based only on the base predictor 120). However, this would again incur a significant performance penalty, because the global history value is useful for distinguishing different program flow paths to the same branch which may cause different target addresses to be calculated depending on data arising from those earlier program flow paths, and so use of the global history value in the hash 132, 134, 136 calculated for looking up prediction state can be extremely beneficial for improving prediction accuracy.

Another approach can be to completely flush the contents of the local branch prediction tables 110, 112, 114, when switching from a less privileged state (e.g. EL0) to a more privileged state (e.g. EL1). However, this would have a drastic effect on performance, causing a great slowdown because all the information learned from previous branches will be lost on a supervisor call, causing branches to be mispredicted for a long period afterwards. There is also a performance overhead because invalidation of table entries takes some time. Therefore, this would be undesirable.

Another approach can be to clear the contents of the branch history storage 100 when the supervisor call is made from the less privileged execution state (e.g. EL0) to the more privileged state (e.g. EL1). However, again this would have an effect of reducing performance because, firstly, many supervisor calls only cause the ED code to be executed for a relatively short time before switching back to EL0, and following the return to EL0, the information on previous branch history associated with the earlier period of execution of EL0 may still be in the history register and may be useful for predicting outcomes of subsequent branches in EL0. Also, even while executing branches in ED following the supervisor call, in some scenarios branch predictor accuracy may be higher if information allocated by EL0 can be considered, because the behaviour of a branch in ED executed shortly after an entry point from EL0 may depend on the location in the EL0 code from which the supervisor call was made, which could be distinguished based on branch history of previous branches executed by EL0. Also, there are aspects of branch prediction which can safely be predicted based on branch history allocated by EL0, without risk of the Spectre-BHB attack. For example, the taken/not-taken outcome prediction made by the branch direction predictor 44 may (provided the branch target address prediction is not successfully attacked) not be at risk of causing a vulnerable gadget to be executed because it merely controls whether the next instruction executed after branch X 166 is the sequential instruction following branch X 166 or one of the legitimate safe targets T_X0, T_X1. If the contents of the branch history storage 100 were flushed on each supervisor call, this would reduce the accuracy of the branch direction prediction of a branch following the supervisor call. From analysis of typical software workloads, it has been identified that supervisor calls may occur relatively frequently in some workloads (e.g. every few thousand processing cycles) and so flushing the global history 100 on each supervisor call would have a negative impact on performance.

Instead, the prediction control circuitry 102 protects against the Spectre-BHB attack in a different way. On a transition from a less privileged execution state (e.g. EL0) to a more privileged execution state (e.g. EL1), the contents of the branch history storage 100 are not changed, and so the global branch history is left as it is (including any branch property information which may have been maliciously trained by an attacker). Instead, the prediction control circuitry 102 uses the branch counter 104 to count how many branches have had branch properties allocated into the branch history storage since the change of execution state. The prediction control circuitry 102 resets the branch counter 104 to an initial value (reset value) in response to the execution state switch, and then the branch counter 104 is advanced (e.g. incremented or decremented) each time a subsequent branch causes an update to the branch history storage. The prediction control circuitry 102 then controls generation of the enable signals 144, 146, 148 for the tagged-geometric tables 110, 112, 114 so that these prediction resources are disabled in response to the execution state switch, but subsequently re-enabled selectively once the used portion GHR0, GHR1, . . . , GHR(M−1) for the respective tables has become "safe", that is when the counter 104 indicates that a sufficient number of branches have been encountered since the execution state switch that the corresponding portion of branch history used for looking up that table represents only outcomes of branches executed since the execution state switch.

Figure 5:
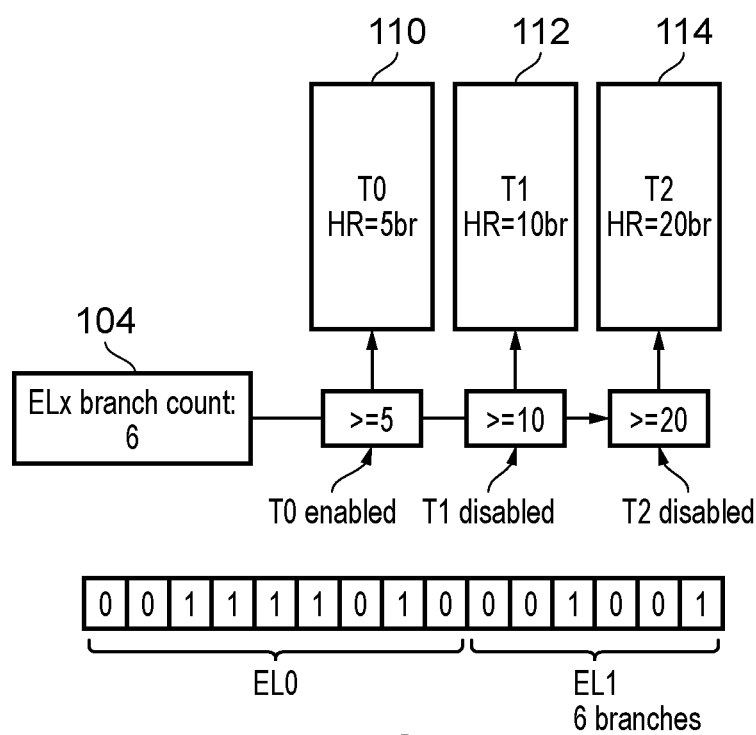
FIG. 5 illustrates gradual re-enabling of prediction tables depending on a number of branches for which a branch property has been allocated to the branch history storage since an execution state switch to a more privileged execution state.

Hence, as shown in FIG. 5, for an implementation with three tagged-geometric tables T0, T1, T2 (110, 112, 114) looked up based on portions of branch history corresponding to 5 branches, 10 branches and 20 branches respectively, all of these tables T0, T1, T2 can initially be disabled in response to the execution state switch, but table T0 110 can be re-enabled when the counter 104 indicates that the number of branches seen since the execution state switch is 5 or more, table T1 112 can be re-enabled when the counter 104 indicates that the number of branches seen since the execution state switch is 10 or more, and table T2 114 can be re-enabled when the counter 104 indicates that the number of branches seen since the execution state switch is 20 or more. Also, all of the tables can be re-enabled if there is a subsequent switch back to the less privileged execution state EL0. Hence, in the scenario shown in FIG. where the number of branches indicated by the counter 104 is 6, then table T0 110 is currently enabled but tables T1 and T2 112, 114 are currently disabled.

Figure 6:
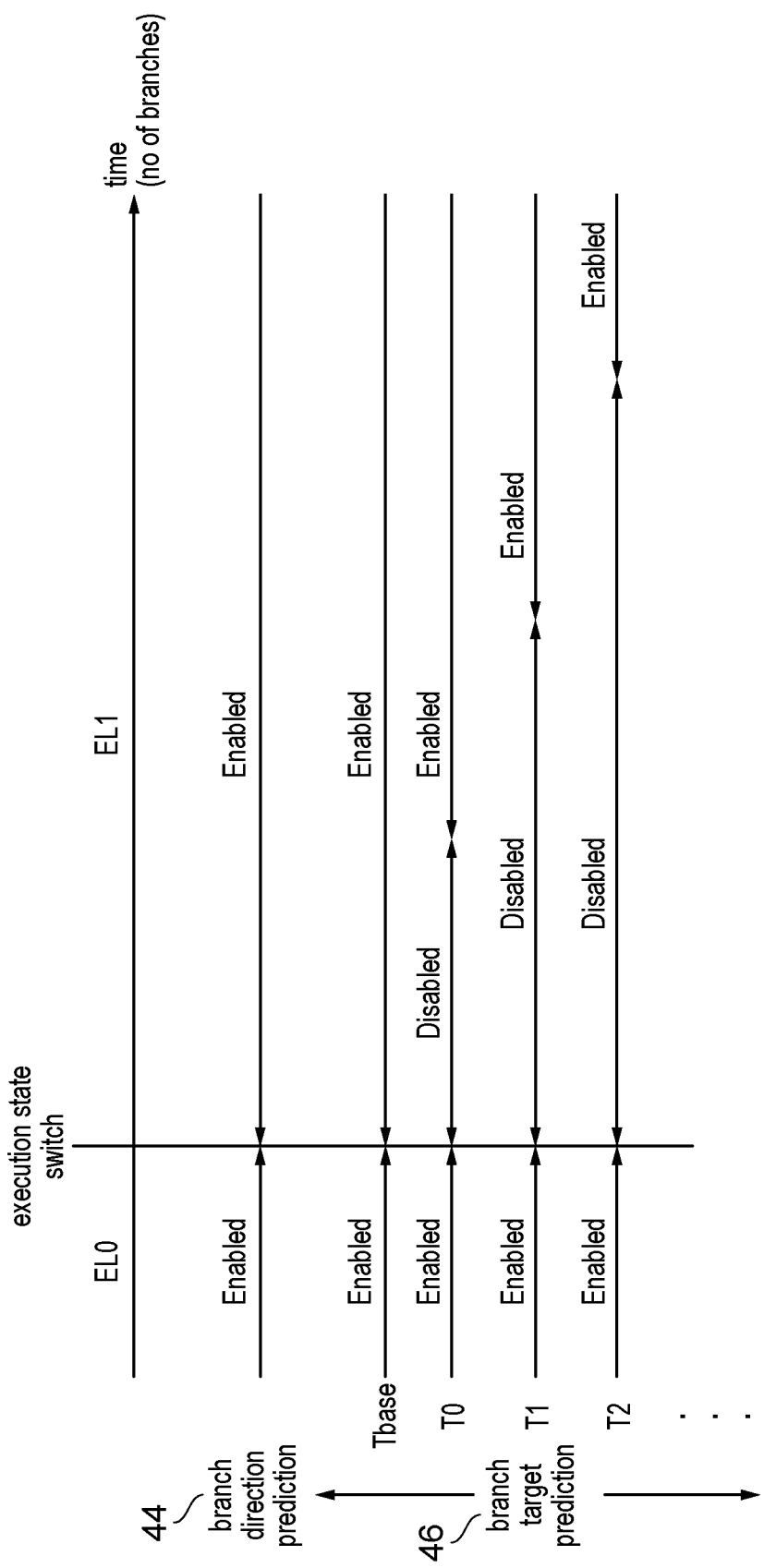
FIG. 6 illustrates how use of the branch history for a second type of prediction can remain enabled following the execution state switch while tagged-geometric tables used for a first type of prediction are gradually being re-enabled.

Hence, as shown in FIG. 6, following the execution state switch from EL0 to EL1, all of the tagged-geometric prediction tables T0, T1, T2, etc. which are looked up based on the global branch history in the branch history storage 100 are temporarily disabled. Gradually, as the number of branches executed in ED increases, each of the tagged-geometric tables T0, T1, T2 is successively re-enabled in ascending order of the length of history used for lookup. Hence, performance recovery is gradual and allows each prediction resource to be re-enabled as soon as it is safe to do so. Meanwhile, the use of the base prediction table 120 (which does not depend on branch history information from the branch history storage 100) remains enabled following the execution state switch. Also, the branch direction predictor 44 (which, given that branch target prediction has now been made safe, can be safely predicted based on the global branch history of branch history storage 100 even when an attacker maliciously trains that history) remains enabled following the execution state switch and so does not need to suffer in terms of performance, as would be the case for the alternative approaches discussed above where the global branch history 100 or prediction tables used by the branch direction predictor 44 are flushed in response to the execution state switch.

While the examples discussed above relate to polymorphic branch target prediction (e.g. ITTAGE), a similar technique may be used for any other type of predictor which uses at least one prediction table looked up based on a portion of the global branch history stored in the branch history storage 100. For example, other prediction structures, such as the data prefetcher 50, load value predictor 52, instruction prefetcher 54 and instruction value predictor 56, could also use a portion of branch history read from the branch history storage 100 to look up prediction state and so could be vulnerable to similar attacks to the Spectre-BHB attack discussed above. For example, a TAGE predictor (a tagged-geometric predictor used to predict branch direction—taken or not-taken outcome) or a VTAGE predictor (a tagged-geometric predictor used as the load value predictor 52 or instruction value predictor 56) could make use of these techniques. A tagged-geometric predictor could be any of TAGE, VTAGE or ITTAGE for example.

In any of these examples, those prediction circuits could also be provided with prediction control circuitry 102 to selectively disable/enable use of predictions based on prediction state looked up based on branch history information from the global history register 100, with the disable/enable control based on whether the number of branches executed since the execution state switch to a more privileged execution state has exceeded the number of branches corresponding to the size of the portion of branch history information used for the lookup.

Also, while the technique is particularly useful for tagged-geometric predictors with a number of geometrically-tagged tables looked up based on successively longer portions of branch history, the technique can also be used for a predictor which only has one prediction table looked up based on a single fixed size portion of branch history, with the branch counter 104 being used to determine when the number of branches encountered since the execution state switch reaches the number of branches represented by that fixed size portion of branch history, at which point the use of that prediction table can be re-enabled.

Figure 7:
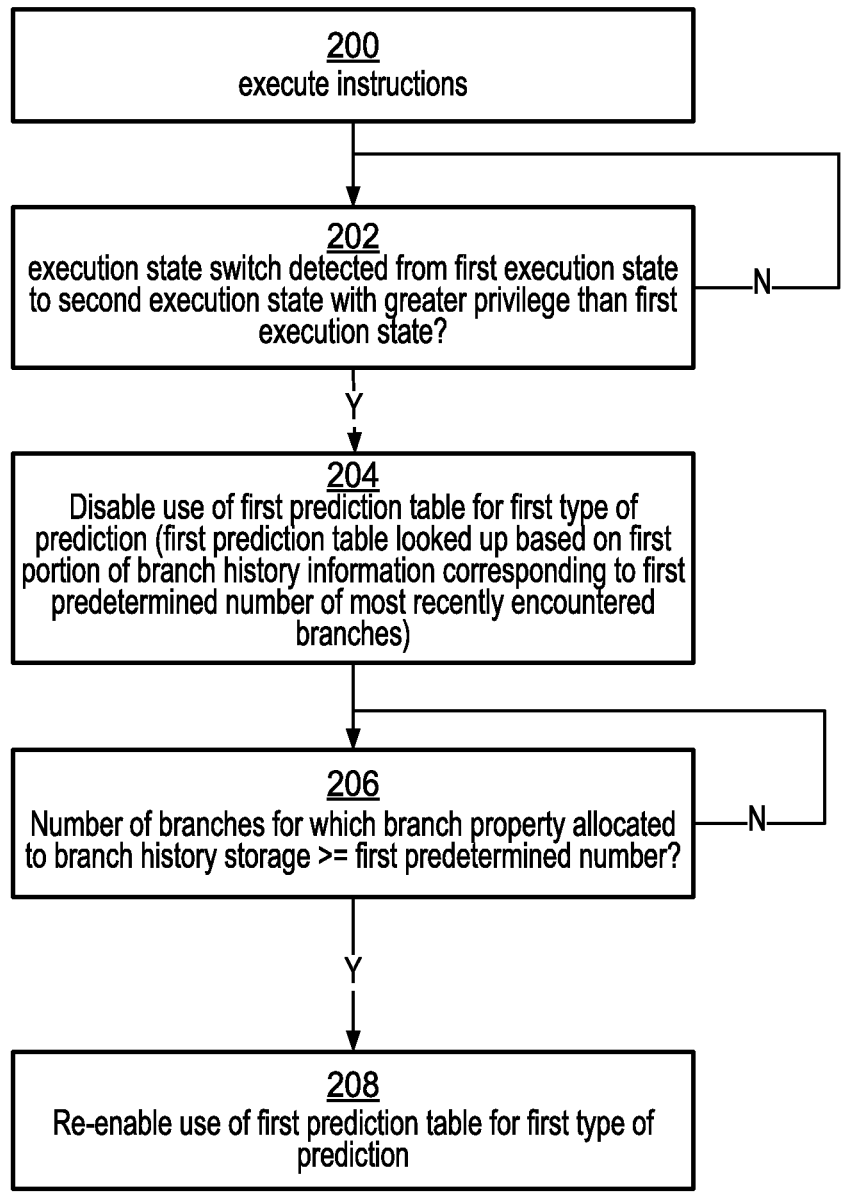
FIG. 7 is a flow diagram illustrating a method of controlling predictions for a processing apparatus.

Hence, FIG. 7 illustrates a method for a data processing system which has prediction circuitry which determines a first type of prediction (e.g. branch target address prediction by polymorphic branch target address predictor 46, prefetch prediction by data/instruction prefetcher 50 or 54, or value prediction by data/instruction value predictor 52, 56) based at least on a first prediction table (e.g. one of tagged-geometric tables 110, 112, 114) storing prediction information looked up based on at least a first portion of the branch history information corresponding to a first predetermined number of branches. At step 200, instructions are executed by the processing circuitry 4 of the data processing system 2. At step 202, the prediction control circuitry 102 detects whether an execution state switch has been detected from a first execution state (e.g. EL0) to a second execution state (e.g. EL1) having greater privilege than the first execution state. If no such execution state switch is detected then instruction execution and use of prediction resources continues as normal.

If an execution state switch to an execution state with greater privilege is detected, then at step 204 the prediction control circuitry 102 disables use of the first prediction table for generating the first type of prediction. A second prediction table (or further prediction table) whose lookup is based on branch history information from storage 100 may also be disabled. A second type of prediction (e.g. branch direction prediction 44) may remain enabled despite being looked up based on global branch history allocated before the execution state switch 100. There is no need for the prediction control circuitry 102 to trigger any flushing or invalidation of global branch history allocated in the branch history storage 100 before the execution state switch. The prediction control circuitry 102 resets the branch counter 104 and the branch counter 104 starts to count branches executed following the execution state switch which have caused an update to the branch history storage 100.

At step 206, the prediction control circuitry 102 determines whether the number of branches for which at least one branch property was allocated to the branch history storage 100 is greater than or equal to the first predetermined number of branches corresponding to the size of the portion of branch history used for the lookup of the first prediction table. If not, then the prediction control circuitry 102 continues to wait for the number of branches to reach the first predetermined number. Once the number of branches causing an update to the branch history storage 100 since the execution state switch reaches the first prediction number, then at step 208 use of the first prediction table for generating the first type of prediction is re-enabled.

If there is more than one prediction table which is looked up based on different sized portions of branch history from storage 100, then those tables are re-enabled in response to the number of branches counted by branch counter 104 reaching different thresholds corresponding to the size of the respective portions of branch history used for the lookup. Hence, use of a second prediction table for generating the first type of prediction may be re-enabled when the branch counter 104 indicates that the number of branches causing an update to the branch history storage 100 since the execution state switch exceeds a second predetermined number (which may be greater than the first predetermined number used for the first prediction table).

Also, while not shown in FIG. 7, if there is a return to the first execution state while any of the prediction tables are still disabled because the number of branches counted by branch counter 104 has not yet reached the corresponding threshold for that table to be re-enabled, then use of that prediction table can be re-enabled in response to the return is a first execution state.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Various examples are set out in the clauses below:

1. An apparatus comprising:
    processing circuitry having a plurality of execution states for execution of instructions;
    branch history storage to store branch history information indicative of at least one branch property for a sequence of branches;
    prediction circuitry to determine a prediction for controlling execution of at least one instruction by the processing circuitry, where the prediction circuitry is configured to determine a first type of prediction based at least on a first prediction table storing prediction information looked up based on at least a first portion of the branch history information corresponding to a first predetermined number of branches; and
    prediction control circuitry to:
        in response to detecting an execution state switch of the processing circuitry from a first execution state to a second execution state more privileged than the first execution state, disable use of the first prediction table in determining the first type of prediction; and
        in response to detecting that a number of branches causing an update to the branch history storage since the execution state switch is greater than or equal to the first predetermined number, re-enable use of the first prediction table in determining the first type of prediction.

2. The apparatus according to clause 1, in which in response to a return to the first execution state occurring after the execution state switch when the number of branches causing an update to the branch history storage since the execution state switch is still less than the first predetermined number, the prediction control circuitry is configured to re-enable use of the first prediction table in determining the first type of prediction.

3. The apparatus according to any of clauses 1 and 2, in which the prediction circuitry is configured to determine the first type of prediction based on at least the first prediction table and a second prediction table storing prediction information looked up based on at least a second portion of the branch history information corresponding to a second predetermined number of branches, where the second predetermined number is greater than the first predetermined number.

4. The apparatus according to clause 3, in which the prediction control circuitry is configured to: in response to detecting the execution state switch, disable use of the second prediction table in determining the first type of prediction; and in response to detecting that the number of branches causing an update to the branch history storage since the execution state switch is greater than or equal to the second predetermined number, re-enable use of the second prediction table in determining the first type of prediction.

5. The apparatus according to any of clauses 3 and 4, in which the prediction control circuitry is configured to: in response to detecting the execution state switch, disable use of the second prediction table in determining the first type of prediction; and re-enable use of the first prediction table for determining the first type of prediction earlier than re-enabling use of the second prediction table for determining the first type of prediction.

6. The apparatus according to any preceding clause, in which the prediction circuitry is configured to determine the first type of prediction based on a plurality of tagged-geometric prediction tables, including the first prediction table, looked up based on respective portions of the branch history information corresponding to successively increasing numbers of branches, wherein the prediction circuitry is configured to select, as the first type of prediction, a prediction based on the tagged-geometric prediction table which, among the tagged-geometric prediction tables currently enabled for use and which detect a lookup hit, is looked up based on a portion of branch history information corresponding to the greatest number of branches; and following the execution state switch, the prediction control circuitry is configured to gradually re-enable use of the respective tagged-geometric prediction tables in ascending order of the number of branches corresponding to the respective portions of the branch history information used for looking up the respective tagged-geometric prediction tables.

7. The apparatus according to any preceding clause, in which the prediction circuitry is configured to determine a second type of prediction depending on at least a portion of the branch history information; and following the execution state switch, the prediction control circuitry is configured to enable use of said at least a portion of the branch history information for determining the second type of prediction, even when use of the first prediction table for determining the first type of prediction is disabled.

8. The apparatus according to clause 7, in which, following the execution state switch, the prediction control circuitry is configured to enable use of said at least a portion of the branch history information for determining the second type of prediction, independent of the number of branches causing an update to the branch history storage since the execution state switch.

9. The apparatus according to any of clauses 7 and 8, in which: the first type of prediction comprises a prediction of a branch target address; and the second type of prediction comprises a prediction of whether a branch is taken or not-taken.

10. The apparatus according to any preceding clause, comprising a branch counter to count the number of branches causing an update to the branch history storage; in which: the prediction control circuitry is configured to reset the branch counter to a reset value in response to detecting the execution state switch; and following the execution state switch, the prediction control circuitry is configured to determine, based on the branch counter, whether to re-enable use of the first prediction table in determining the first type of prediction.

11. The apparatus according to any preceding clause, in which the prediction circuitry is configured to look up the first prediction table based on a hash value derived from a program counter address and the first portion of the branch history information.

12. The apparatus according to any preceding clause, in which each entry of the first prediction table is associated with a context identifier distinguishing entries allocated in different execution contexts, where execution contexts corresponding to the first execution state and the second execution state have different context identifiers; and in a lookup of the first prediction table performed for a first execution context, the prediction circuitry is configured to detect a miss for a given entry of the first prediction table when a mismatch is detected between the context identifier for the given entry and a context identifier associated with the first execution context.

13. The apparatus according to any preceding clause, in which the branch history storage is configured to update the branch history information for the sequence of branches based on a first-in-first-out policy.

14. The apparatus according to any preceding clause, in which, in response to a newly encountered branch, the branch history storage is configured to update a given location of the branch history storage based on the at least one branch property of the newly encountered branch, said given location being selected independent of a program counter address of the newly encountered branch.

15. The apparatus according to any preceding clause, in which, for a given branch in the sequence of branches, the at least one branch property comprises information dependent on at least one of: a taken/not-taken outcome for the given branch; and a branch target address for the given branch.

16. The apparatus according to any preceding clause, in which the first type of prediction comprises branch target address prediction.

17. The apparatus according to any preceding clause, in which the first type of prediction comprises polymorphic branch target address prediction, and the first prediction table supports two or more entries being allocated to provide two or more different target addresses corresponding to the same branch instruction but different values of the first portion of the branch history information.

18. The apparatus according to any of clauses 1 to 15, in which the first type of prediction comprises a prefetch prediction for determining data or instructions to be prefetched into a cache.

19. The apparatus according to any of clauses 1 to 15, in which the first type of prediction comprises a value prediction to predict a value of data or instructions to be loaded from memory.

20. A method comprising:
   executing instructions using an apparatus comprising processing circuitry having a plurality of execution states for execution of instructions, branch history storage to store branch history information indicative of at least one branch property for a sequence of branches, and prediction circuitry to determine a prediction for controlling execution of at least one instruction by the processing circuitry, where the prediction circuitry is configured to determine a first type of prediction based at least on a first prediction table storing prediction information looked up based on at least a first portion of the branch history information corresponding to a first predetermined number of branches;
   in response to detecting an execution state switch of the processing circuitry from a first execution state to a second execution state more privileged than the first execution state, disabling use of the first prediction table in determining the first type of prediction; and in response to detecting that a number of branches causing an update to the branch history storage since the execution state switch is greater than or equal to the first predetermined number, re-enabling use of the first prediction table in determining the first type of prediction.

21. A computer-readable medium to store computer-readable code for fabrication of an apparatus comprising:

processing circuitry having a plurality of execution states for execution of instructions;

branch history storage to store branch history information indicative of at least one branch property for a sequence of branches;

prediction circuitry to determine a prediction for controlling execution of at least one instruction by the processing circuitry, where the prediction circuitry is configured to determine a first type of prediction based at least on a first prediction table storing prediction information looked up based on at least a first portion of the branch history information corresponding to a first predetermined number of branches; and prediction control circuitry to:

in response to detecting an execution state switch of the processing circuitry from a first execution state to a second execution state more privileged than the first execution state, disable use of the first prediction table in determining the first type of prediction; and in response to detecting that a number of branches causing an update to the branch history storage since the execution state switch is greater than or equal to the first predetermined number, re-enable use of the first prediction table in determining the first type of prediction.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:

processing circuitry having a plurality of execution states for execution of instructions;

branch history storage to store branch history information indicative of at least one branch property for a sequence of branches;

prediction circuitry to determine a prediction for controlling execution of at least one instruction by the processing circuitry, where the prediction circuitry is configured to determine a first type of prediction based at least on a first prediction table storing prediction information looked up based on at least a first portion of the branch history information corresponding to a first predetermined number of branches; and prediction control circuitry to:

in response to detecting an execution state switch of the processing circuitry from a first execution state to a second execution state more privileged than the first execution state, disable use of the first prediction table in determining the first type of prediction; and in response to detecting that a number of branches causing an update to the branch history storage since the execution state switch is greater than or equal to the first predetermined number, re-enable use of the first prediction table in determining the first type of prediction;

wherein in response to a return to the first execution state occurring after the execution state switch when the number of branches causing an update to the branch history storage since the execution state switch is still less than the first predetermined number of branches, the prediction control circuitry is configured to re-enable use of the first prediction table in determining the first type of prediction.

2. The apparatus according to claim 1, in which the prediction circuitry is configured to determine the first type of prediction based on at least the first prediction table and a second prediction table storing prediction information looked up based on at least a second portion of the branch history information corresponding to a second predetermined number of branches, where the second predetermined number of branches is greater than the first predetermined number of branches.

3. The apparatus according to claim 2, in which the prediction control circuitry is configured to:

in response to detecting the execution state switch, disable use of the second prediction table in determining the first type of prediction; and in response to detecting that the number of branches causing an update to the branch history storage since the execution state switch is greater than or equal to the second predetermined number, re-enable use of the second prediction table in determining the first type of prediction.

4. The apparatus according to claim 2, in which the prediction control circuitry is configured to:

in response to detecting the execution state switch, disable use of the second prediction table in determining the first type of prediction; and re-enable use of the first prediction table for determining the first type of prediction earlier than re-enabling use of the second prediction table for determining the first type of prediction.

5. The apparatus according to claim 1, in which the prediction circuitry is configured to determine the first type of prediction based on a plurality of tagged-geometric prediction tables, including the first prediction table, looked up based on respective portions of the branch history information corresponding to successively increasing numbers of branches, wherein the prediction circuitry is configured to select, as the first type of prediction, a prediction based on a tagged-geometric prediction table which, among the plurality of tagged-geometric prediction tables currently enabled for use and which detect a lookup hit, is looked up based on a portion of branch history information corresponding to the greatest number of branches; and following the execution state switch, the prediction control circuitry is configured to gradually re-enable use of respective tagged-geometric prediction tables in ascending order of the number of branches corresponding to the respective portions of the branch history information used for looking up the respective tagged-geometric prediction tables.

6. The apparatus according to claim 1, comprising a branch counter to count the number of branches causing an update to the branch history storage; in which:
the prediction control circuitry is configured to reset the branch counter to a reset value in response to detecting the execution state switch; and
following the execution state switch, the prediction control circuitry is configured to determine, based on the branch counter, whether to re-enable use of the first prediction table in determining the first type of prediction.

7. The apparatus according to claim 1, in which the prediction circuitry is configured to look up the first prediction table based on a hash value derived from a program counter address and the first portion of the branch history information.

8. The apparatus according to claim 1, in which the branch history storage is configured to update the branch history information for the sequence of branches based on a first-in-first-out policy.

9. The apparatus according to claim 1, in which, in response to a newly encountered branch, the branch history storage is configured to update a given location of the branch history storage based on the at least one branch property of the newly encountered branch, said given location being selected independent of a program counter address of the newly encountered branch.

10. The apparatus according to claim 1, in which, for a given branch in the sequence of branches, the at least one branch property comprises information dependent on at least one of:
a taken/not-taken outcome for the given branch;
a branch target address for the given branch; and
a branch type for the given branch.

11. The apparatus according to claim 1, in which the first type of prediction comprises branch target address prediction.

12. The apparatus according to claim 1, in which the first type of prediction comprises polymorphic branch target address prediction, and the first prediction table supports two or more entries being allocated to provide two or more different target addresses corresponding to the same branch instruction but different values of the first portion of the branch history information.

13. The apparatus according to claim 1, in which the first type of prediction comprises a prefetch prediction for determining data or instructions to be prefetched into a cache.

14. The apparatus according to claim 1, in which the first type of prediction comprises a value prediction to predict a value of data or instructions to be loaded from memory.

15. An apparatus comprising:
processing circuitry having a plurality of execution states for execution of instructions;
branch history storage to store branch history information indicative of at least one branch property for a sequence of branches;
prediction circuitry to determine a prediction for controlling execution of at least one instruction by the processing circuitry, where the prediction circuitry is configured to determine a first type of prediction based at least on a first prediction table storing prediction information looked up based on at least a first portion of the branch history information corresponding to a first predetermined number of branches; and
prediction control circuitry to:
in response to detecting an execution state switch of the processing circuitry from a first execution state to a second execution state more privileged than the first execution state, disable use of the first prediction table in determining the first type of prediction; and
in response to detecting that a number of branches causing an update to the branch history storage since the execution state switch is greater than or equal to the first predetermined number, re-enable use of the first prediction table in determining the first type of prediction;
wherein the prediction circuitry is configured to determine a second type of prediction depending on at least a portion of the branch history information; and
wherein following the execution state switch, the prediction control circuitry is configured to enable use of said at least a portion of the branch history information for determining the second type of prediction, even when use of the first prediction table for determining the first type of prediction is disabled.

16. The apparatus according to claim 15, in which, following the execution state switch, the prediction control circuitry is configured to enable use of said at least a portion of the branch history information for determining the second type of prediction, independent of the number of branches causing an update to the branch history storage since the execution state switch.

17. The apparatus according to claim 15, in which:
the first type of prediction comprises a prediction of a branch target address; and
the second type of prediction comprises a prediction of whether a branch is taken or not-taken.

18. A non-transitory computer-readable medium to store computer-readable code for fabrication of an apparatus comprising:
processing circuitry having a plurality of execution states for execution of instructions;
branch history storage to store branch history information indicative of at least one branch property for a sequence of branches;
prediction circuitry to determine a prediction for controlling execution of at least one instruction by the processing circuitry, where the prediction circuitry is configured to determine a first type of prediction based at least on a first prediction table storing prediction information looked up based on at least a first portion of the branch history information corresponding to a first predetermined number of branches; and
prediction control circuitry to:
in response to detecting an execution state switch of the processing circuitry from a first execution state to a second execution state more privileged than the first execution state, disable use of the first prediction table in determining the first type of prediction; and
in response to detecting that a number of branches causing an update to the branch history storage since the execution state switch is greater than or equal to the first predetermined number, re-enable use of the first prediction table in determining the first type of prediction;
wherein in response to a return to the first execution state occurring after the execution state switch when the number of branches causing an update to the branch history storage since the execution state switch is still less than the first predetermined number of branches, the prediction control circuitry is configured to re-enable use of the first prediction table in determining the first type of prediction.

* * * * *